US006852676B1

United States Patent
Chatterji et al.

(10) Patent No.: US 6,852,676 B1
(45) Date of Patent: Feb. 8, 2005

(54) WELL COMPLETION FOAMED SPACER FLUIDS AND METHODS

(75) Inventors: Jiten Chatterji, Duncan, OK (US); James E. Griffith, Loco, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/630,145

(22) Filed: Jul. 30, 2003

Related U.S. Application Data

(62) Division of application No. 10/393,965, filed on Mar. 21, 2003, now Pat. No. 6,668,927.

(51) Int. Cl.$^7$ .................................................. C09K 3/00
(52) U.S. Cl. ...................... 507/202; 507/209; 507/213; 507/216; 507/219; 507/220; 507/224; 507/228; 507/244; 507/245; 507/254; 507/259; 507/269; 507/271
(58) Field of Search ............................. 507/102, 202, 507/209, 213, 216, 219, 220, 224, 228, 244, 245, 254, 259, 269, 271

(56) References Cited

U.S. PATENT DOCUMENTS

| | | | | |
|---|---|---|---|---|
| 3,846,316 A | | 11/1974 | Motley et al. | 252/8.5 P |
| 4,093,028 A | | 6/1978 | Brandon | 166/281 |
| 4,869,321 A | | 9/1989 | Hamilton | 166/277 |
| 4,899,819 A | | 2/1990 | Hazlett et al. | 166/285 |
| 5,247,995 A | | 9/1993 | Tjon-Joe-Pin et al. | 166/312 |
| 5,284,207 A | | 2/1994 | Bittleston et al. | 166/291 |
| 5,552,377 A | | 9/1996 | Kindred | 507/209 |
| 5,716,910 A | * | 2/1998 | Totten et al. | 507/102 |
| 5,829,526 A | | 11/1998 | Rogers et al. | 166/291 |
| 5,851,960 A | * | 12/1998 | Totten et al. | 507/118 |
| 5,866,517 A | | 2/1999 | Carpenter et al. | 507/226 |
| 5,909,774 A | | 6/1999 | Griffith et al. | 166/312 |
| 5,945,387 A | * | 8/1999 | Chatterji et al. | 507/224 |
| 5,968,879 A | * | 10/1999 | Onan et al. | 507/202 |
| 5,977,032 A | | 11/1999 | Chan | 507/211 |
| 6,063,737 A | | 5/2000 | Haberman et al. | 507/261 |
| 6,063,738 A | | 5/2000 | Chatterji et al. | 507/269 |
| 6,090,754 A | | 7/2000 | Chan et al. | 507/110 |
| 6,138,760 A | | 10/2000 | Lopez et al. | 166/300 |
| 6,145,591 A | | 11/2000 | Boncan et al. | 166/291 |
| 6,148,917 A | * | 11/2000 | Brookey et al. | 166/301 |
| 6,213,211 B1 | | 4/2001 | Haberman | 166/292 |
| 6,283,213 B1 | | 9/2001 | Chan | 166/291 |
| 6,297,202 B1 | * | 10/2001 | Chatterji et al. | 507/261 |
| 6,668,927 B1 | * | 12/2003 | Chatterji et al. | 166/291 |
| 6,715,553 B2 | * | 4/2004 | Reddy et al. | 166/309 |
| 2001/0022224 A1 | | 9/2001 | Haberman | 166/285 |

FOREIGN PATENT DOCUMENTS

EP     0 430 644 A1    6/1994        E21B/33/13

OTHER PUBLICATIONS

Foreign communication from a related counterpart application dated Jul. 5, 2004.

* cited by examiner

*Primary Examiner*—Philip C. Tucker
(74) *Attorney, Agent, or Firm*—Craig W. Roddy; McAfee & Taft

(57) ABSTRACT

Well completion foamed spacer fluids and methods of using the foamed spacer fluids are provided. A method of the invention for displacing a first fluid from a well bore with an incompatible second fluid comprises the following steps. A foamed spacer fluid is placed between the first and second fluids to separate the first and second fluids and to remove the first fluid from the walls of the well bore. Thereafter, the first fluid and the foamed spacer fluid are displaced from the well bore with the second fluid.

36 Claims, No Drawings

WELL COMPLETION FOAMED SPACER FLUIDS AND METHODS

CROSS-REFERENCE TO RELATED APPLICATION

This Application is a Divisional of Ser. No. 10/393,965, filed Mar. 21, 2003, now U.S. Pat. No. 6,668,927.

BACKGROUND OF THE INVENTION

1. Field of the Invention

The present invention relates to foamed spacer fluids and methods of using the spacer fluids in well completions such as primary cementing.

2. Description of the Prior Art

Well bores are commonly drilled using the rotary drilling method. In that method, a drill bit connected to a drill string is rotated while drilling fluid is circulated through the drill string, through the drill bit and upwardly to the surface through the annulus between the drill string and the walls of the well bore being drilled. The drilling fluid functions to cool the drill bit, to remove cuttings from the well bore and to maintain hydrostatic pressure on the well bore. The hydrostatic pressure prevents formation fluids from entering the well bore during drilling.

The drilling fluid also forms a filter cake on the walls of the well bore which prevents the drilling fluid from being lost into permeable subterranean zones. However, the drilling fluid in the filter cake dehydrates and gels thereby forming a layer of solids and gelled drilling fluid on the walls of the well bore. While this filter cake is advantageous during drilling, it is detrimental to obtaining effective drilling fluid displacement and removal from the walls of the well bore.

In primary well cementing operations, a hydraulic cement slurry is pumped into the annular space between the walls of the well bore and the exterior surfaces of a pipe string disposed therein. The cement slurry is allowed to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented. If the drilling fluid filter cake is not adequately removed from the walls of the well bore or portions thereof, a competent seal between the hardened cement and the well bore does not result.

Spacer fluids are typically placed between two fluids contained or to be pumped within well bores. Examples of fluids between which spacer fluids are utilized include between hydraulic cement slurries and drilling fluids, between different drilling fluids during drilling fluid change-outs and between drilling fluids and completion brines. The spacers are also utilized to enhance drilling fluid and filter cake removal from the walls of well bores, to enhance displacement efficiency and to physically separate chemically incompatible fluids. For example, a hydraulic cement slurry and drilling fluid are separated by a spacer fluid when the cement slurry is placed in the annulus between a pipe string and the walls of a well bore. The spacer fluid prevents intermixing of the cement slurry and the drilling fluid and facilitates the removal of filter cake and gelled drilling fluid from the walls of the well bore during displacement of the drilling fluid by the cement slurry. If intermixing of the cement slurry and the drilling fluid occurs, viscous masses are formed in the annulus that prevent continued displacement.

The heretofore utilized spacer fluids have achieved varying degrees of success in displacing fluids and removing filter cake, gelled drilling fluid and the like from the walls of the well bore. However, there is a continuing need for improved spacer fluids that achieve greater removal of drilling fluid and filter cake from the walls of the well bore and prevent mixing of incompatible fluids.

SUMMARY OF THE INVENTION

The present invention provides improved water based well completion foamed spacer fluids and methods of using the foamed spacer fluids which meet the need described above and overcome the deficiencies of the prior art. The foamed spacer fluids of this invention exhibit better drilling fluid and drilling fluid filter cake removal because the gas in the foamed spacer fluids energizes the fluids. The gas bubbles are compressed as a foamed spacer fluid is pumped down the pipe string and the hydrostatic pressure increases. As the foamed spacer fluid enters the annulus and is pumped toward the surface, the hydrostatic pressure decreases which allows the gas bubbles to expand and cause the foamed spacer fluid to achieve highly efficient drilling fluid removal from the annulus. The expansion of the gas bubbles also allows the foamed spacer fluid to enter irregular hole configurations and enlarged holes in the well bore and remove drilling fluid and filter cake therefrom. Finally, the increased viscosity of a foamed spacer fluid provides better suspension of removed drilling fluid than the heretofore utilized spacer fluids. The water-based foamed spacer fluids of this invention are particularly well suited for displacing water-based drilling fluids and other water-based fluids.

The water-based foamed spacer fluids are comprised of water, a weighting material, a dispersing agent, a suspending agent and friction reducer, a mixture of foaming and foam stabilizing surfactants and a gas.

The methods are comprised of the following steps. A foamed spacer fluid is placed between first and second fluids in a well bore to separate the first and second fluids and to remove the first fluid from the walls of the well bore. Thereafter, the first fluid and the foamed spacer fluid are displaced from the well bore by the second fluid.

The objects, features and advantages of the present invention will be readily apparent to those skilled in the art upon a reading of the description of preferred embodiments which follows.

DESCRIPTION OF PREFERRED EMBODIMENTS

The water-based foamed spacer fluids of this invention are basically comprised of water, a weighting material, a dispersing agent, a suspending agent and friction reducer, a mixture of foaming and foam stabilizing surfactants and a gas.

A method of this invention for displacing a first fluid from a well bore with an incompatible second fluid is comprised of the following steps. A foamed spacer fluid is placed between the first and second fluids to separate the first and second fluids and to remove the first fluid from the walls of the well bore. Thereafter, the first fluid and the foamed spacer fluid are displaced from the well bore by the second fluid. The foamed spacer fluid of this invention is particularly suitable for use between a drilling fluid and a hydraulic cement slurry.

The water in the foamed spacer fluids of this invention can be fresh water or salt water. The term "salt water" is used herein to mean unsaturated salt solutions and saturated salt solutions including brines and seawater.

Examples of weighting materials that can be utilized in the foamed spacer fluid include, but are not limited to, barium sulfate, hematite, manganese tetraoxide and calcium carbonate. Of these, barium sulfate is preferred. The weighting material is included in the foamed spacer fluids in an amount in the range of from about 49 to about 576 pounds per barrel of water therein.

The dispersing agent is included in the foamed spacer fluids to disperse the solids and other materials in the water. Examples of dispersing agents that can be utilized include, but are not limited to, naphthalene sulfonate condensed with formaldehyde, sodium polyacrylate, a terpolymer of acrylic acid, alkyloxybenzene sulfonate and methally sulfonate, formaldehyde, acetone, bisulfate condensate, melamine formaldehyde condensate, and mixtures thereof. The dispersing agent is included in the foamed spacer fluid in an amount in the range of from about 3.5% to about 6% by weight of the water therein.

The suspending agent and friction reducer is included in the foamed spacer fluid to suspend the weighting material and other solids therein as well as to reduce friction during pumping of the foamed spacer fluid. Examples of suspending agent and friction reducers that can be utilized include, but are not limited to, sepiolite, whelan gum, xanthan gum, hydroxyethylcellulose, bentonite, attapulgite, and mixtures thereof. Of these, xanthan gum is preferred. The suspending agent and friction reducer is included in the foamed spacer fluid in an amount in the range of from about 0.5% to about 2.0% by weight of water therein.

The mixture of foaming and foam stabilizing surfactants functions to facilitate the formation of a foam and to stabilize the foam during its use. Examples of such surfactant mixtures that can be used include, but are not limited to, a mixture of an ethoxylated alcohol ether sulfate surfactant, an alkyl or alkene amidopropyl betaine surfactant and an alkyl or alkene admidopropyl dimethyl amine oxide surfactant and a mixture of an alpha-olefinic sulfonate surfactant and an alkyl or alkene amidopropyl betaine surfactant. Of these, the mixture of an ethoxylated alcohol ether sulfate surfactant, an alkyl or alkene amidopropyl betaine surfactant and an alkyl or alkene admidopropyl dimethyl amine oxide surfactant is preferred. This mixture is described in detail in U.S. Pat. No. 6,063,738 issued to Chatterji, et al. on May 16, 2000, which is incorporated herein by reference thereto. The mixture of foaming and foam stabilizing surfactants is included in the spacer fluid in an amount in the range of from about 0.5% to about 5% by weight of the water therein.

The gas in the foamed spacer fluid is preferably nitrogen. Generally, the gas is present in the foamed spacer fluid in an amount in the range of from about 15% to about 70% by volume of the water therein.

The foamed spacer fluid can optionally include a well bore scouring material to facilitate the removal of filter cake and gelled drilling fluid from the walls of the well bore. Examples of suitable scouring materials include, but are not limited to, diatomaceous earth, crystalline silica, amorphous silica, and mixtures thereof. Of these, crystalline silica scouring material is preferred. When used, the scouring material is present in the foamed spacer fluid in an amount in the range of from about 15% to about 30% by weight of the water therein.

As mentioned above, the foamed spacer fluids of this invention are particularly useful in primary cementing operations wherein the foamed spacer fluid is placed between a drilling fluid and a hydraulic cement slurry. The drilling fluid can be a water-based drilling fluid, or a foamed drilling fluid.

The hydraulic cement slurry can include various cements including Portland cements, slag cements, pozzolana cements, gypsum cements, aluminous cements, silica cements or high alkalinity cements. Of these, Portland cement is generally preferred. The water in the hydraulic cement slurry can be fresh water or salt water.

A preferred method of this invention for displacing a first fluid from a well bore with an incompatible second fluid comprises the steps of: (a) placing a foamed spacer fluid between the first and second fluids to separate the first and second fluids and to remove the first fluid from the walls of the well bore; and then (b) displacing the first fluid and the foamed spacer fluid from the well bore with the second fluid.

A preferred method of displacing drilling fluid from a well bore with a hydraulic cement slurry comprises the steps of: (a) placing a foamed spacer fluid between the drilling fluid and the hydraulic cement slurry to separate the drilling fluid from the hydraulic cement slurry and to remove the drilling fluid and filter cake from the walls of the well bore, the foamed spacer fluid being comprised of water, a weighting material, a dispersing agent, a suspending agent and friction reducer, a scouring agent, a mixture of foaming and foam stabilizing surfactants and a gas; and then (b) displacing the drilling fluid and the foamed spacer fluid from the well bore with the hydraulic cement slurry.

A preferred foamed spacer fluid of this invention comprises: water; a weighting material; a dispersing agent; a suspending agent and friction reducer; a mixture of foaming and foam stabilizing surfactant; and a gas.

In order to further illustrate the methods and foamed spacer fluids of this invention, the following examples are given.

EXAMPLE 1

A first spacer fluid having a density of 16 pounds per gallon was prepared comprised of 240 grams of fresh water, 397 grams of barium sulfate weighting material, 3.43 grams of a dispersant comprising naphthalene sulfonate condensed with formaldehyde, 4.12 grams of sepiolite suspending agent and friction reducer, 13.73 grams of diatomaceous earth scouring material, 12.25 grams of crystalline silica scouring material, 4.8 grams of a mixture of foaming and foam stabilizing surfactants comprised of an ethoxylated alcohol ether sulfate surfactant, an alkyl or alkene amidopropyl betaine surfactant and an alkyl or alkene amidopropyl dimethyl amine oxide surfactant, and 0.69 grams of a defoaming agent comprising oil and silica. Equal portions of the spacer fluid were then foamed with air to form foamed spacer fluids having densities of 10 pounds per gallon, 12 pounds per gallon and 14 pounds per gallon. Each of the portions of the foamed spacer fluid were then tested for rheology. The results of these tests are given in Table I below.

Three non-foamed spacer fluids were prepared having densities of 10 pounds per gallon, 12 pounds per gallon and 14 pounds per gallon, respectively. The 10 pound per gallon non-foamed spacer fluid was comprised of 309.7 grams of fresh water, 45 grams of barium sulfate weighting material, 6.37 grams of a naphthalene sulfonate condensed with formaldehyde dispersing agent, 7.64 grams of sepiolite suspending agent and friction reducer, 25.4 grams of diatomaceous earth scouring material, 22.75 grams of crystalline sand scouring material, 6.19 grams of the mixture of foaming and foam stabilizing surfactants described above and 1.27 grams of oil and silica defoamer. 0.74 cubic centimeters of a spacer mixing aid was added to the 10 pound per gallon non-foamed spacer fluid and the resulting mixture was blended. The spacer mixing aid had the following composition: 39.5% xanthan gum, 48.3% mineral oil, 2.70% oleophilic clay, 5.9% nonylphenol with 3 moles of ethyleneoxide and 3.9% naphthalene sulfonate condensed with formaldehyde.

The 12 pound per gallon non-foamed spacer fluid was comprised of 286.5 grams of fresh water, 163 grams of barium sulfate weighting material, 5.39 grams of the dispersing agent described above, 6.47 grams of the suspending agent and friction reducer described above, 21.58 grams of diatomaceous earth scouring material, 19.25 grams of crystalline sand scouring material, 5.72 grams of the mixture of foaming and foam stabilizing surfactants described above, and 1.08 grams of the defoaming agent described above. In addition, 0.68 cubic centimeters of the spacer mixing aid described above was added to the spacer fluid. Thereafter, the non-foamed spacer fluid was blended.

The 14 pound per gallon non-foamed spacer fluid comprised 263 grams of fresh water, 280 grams of barium sulfate weighting material, 4.41 grams of the dispersing agent described above, 5.92 grams of the suspending agent and friction reducer described above, 17.65 grams of the diatomaceous earth scouring material, 15.75 grams of the crystalline sand scouring material, 5.26 grams of the mixture of foaming and foam stabilizing surfactants, 0.88 grams of the oil and silica defoaming agent and 0.63 cubic centimeters of the above described spacer mixing aid. Thereafter, the non-foamed spacer fluid was blended.

The rheologies of the non-foamed spacer fluids described above were measured and are set forth in Table II below.

From Tables I and II, it can be seen that the rheologies of the foamed spacer fluids of this invention are much higher than the rheologies of the non-foamed spacer fluids at temperatures of 80° F., 130° F. and 180° F. The higher rheologies of the foamed spacer fluids of this invention allow them to be pumped in laminar flow at reasonable displacement rates. These properties improve drilling fluid displacement while maintaining drilling fluid and cement slurry isolation.

EXAMPLE 2

The procedures and tests described above were repeated except that the foamed and non-foamed spacer fluids tested were different from those described in Example 1. That is, a 16 pound per gallon mixture was prepared comprising 244.4 grams of water, 407.4 grams of barium sulfate weighting material, 1.16 grams of sodium polyacrylate dispersing agent, 0.73 grams of an acrylic acid, alkyloxybenzene sulfonate and methally sulfonate terpolymer dispersant, 0.29 grams of whelan gum suspending agent and friction reducer, 0.1 gram of hydroxyethylcellulose suspending agent and friction reducer, 4.34 grams of sepiolite suspending agent and friction reducer, 12.74 grams of amorphous silica scouring material and 4.8 grams of the mixture of foaming and foam stabilizing surfactants described above.

The 16 pound per gallon spacer composition was divided into three portions. The first portion was foamed with air to a density of 10 pounds per gallon, the second portion was foamed with air to a density of 12 pounds per gallon and the third portion was foamed with air to a density of 14 pounds per gallon. Each of the foamed portions were then tested for rheology at 80° F., 130° F. and 180° F. The results of these tests are set forth in Table III below.

A 10 pound per gallon non-foamed spacer fluid was prepared comprised of 318.4 grams of fresh water, 64.8 grams of barium sulfate weighting material, 2.17 grams of

TABLE I

Foamed Spacer Fluid Rheologies At 80° F., 130° F. and 180° F.

| | 10 lb/gal Foamed Spacer | | | 12 lb/gal Foamed Spacer | | | 14 lb/gal Foamed Spacer | | |
|---|---|---|---|---|---|---|---|---|---|
| RPM | 80° F. | 130° F. | 180° F. | 80° F. | 130° F. | 180° F. | 80° F. | 130° F. | 180° F. |
| 600 | 95 | 54 | 40 | 62 | 20 | 20 | 38 | 33 | 30 |
| 300 | 58 | 41 | 30 | 40 | 14 | 11 | 20 | 19 | 19 |
| 200 | 43 | 38 | 22 | 30 | 11 | 7 | 14 | 14 | 15 |
| 100 | 30 | 32 | 19 | 21 | 8 | 5 | 9 | 9 | 11 |
| 6 | 17 | 23 | 12 | 13 | 6.5 | 4 | 2.5 | 5 | 7 |
| 3 | 17 | 22 | 11 | 12 | 6.5 | 3.5 | 2.5 | 5 | 7 |

TABLE II

Non-Foamed Spacer Fluid Rheologies At 80° F., 130° F. and 180° F.

| | 10 lb/gal Non-Foamed Spacer | | | 12 lb/gal Non-Foamed Spacer | | | 14 lb/gal Non-Foamed Spacer | | |
|---|---|---|---|---|---|---|---|---|---|
| RPM | 80° F. | 130° F. | 180° F. | 80° F. | 130° F. | 180° F. | 80° F. | 130° F. | 180° F. |
| 600 | 17 | 13 | 12.5 | 32 | 25 | 33 | 50 | 45 | 57 |
| 300 | 10 | 8 | 8 | 19 | 16 | 23 | 30 | 30 | 35 |
| 200 | 7 | 6 | 6.5 | 15 | 12 | 19 | 22 | 25 | 26 |
| 100 | 5 | 4.5 | 5 | 10 | 9.5 | 15 | 15 | 19 | 18 |
| 6 | 2 | 3 | 4.5 | 6 | 8 | 13 | 6.5 | 7 | 8 |
| 3 | 2 | 3 | 4.5 | 6 | 8 | 13 | 6.5 | 7 | 7 | sodium polyacrylate dispersing agent, 1.38 grams of an acrylic acid, alkyloxybenzene sulfonate and methally sulfonate terpolymer dispersant, 0.54 grams of whelan gum suspending agent and friction reducer, 0.18 grams of hydroxyethylcellulose suspending agent and friction reducer, 8.15 grams of sepiolite suspending agent and friction reducer and 23.89 grams of amorphous silica scouring material.

The 12 pound per gallon non-foamed spacer comprised 293.7 grams of fresh water, 179 grams of barium sulfate weighting agent, 1.84 grams of sodium polyacrylate dispersing agent, 1.6 grams of the above described terpolymer dispersing agent, 0.46 grams of whelan gum suspending agent and friction reducer, 0.15 grams of hydroxyethylcellulose suspending agent and friction reducer, 6.89 grams of sepiolite suspending agent and friction reducer and 20.2 grams of amorphous silica scouring material.

The 14 pound per gallon non-foamed spacer comprised 269.1 grams of fresh water, 293.2 grams of barium sulfate weighting material, 1.49 grams of sodium polyacrylate dispersant, 0.95 grams of the above described terpolymer dispersant, 0.37 grams of whelan gum suspending agent and friction reducer, 0.12 grams of hydroxyethylcellulose suspending agent and friction reducer, 5.6 grams of sepiolite dispersing agent and friction reducer and 16.43 grams of amorphous silica scouring agent. After being prepared, the non-foamed spacing fluids were blended. After being blended, the non-foamed spacer fluids were each tested for rheology at 80° F., 130° F. and 180° F. The results of these tests are set forth in Table IV below.

walls of the well bore while maintaining drilling fluid and cement slurry isolation.

What is claimed is:

1. A foamed spacer fluid comprising:
    water selected from the group consisting of fresh water and salt water;
    a weighting material selected from the group consisting of barium sulfate, hematite, manganese tetraoxide and calcium carbonate present in an amount in the range of from about 49 to about 576 pounds per barrel of water;
    a dispersing agent selected from the group consisting of naphthalene sulfonate condensed with formaldehyde; sodium polyacrylate, a terpolymer of acrylic acid, alkyloxybenzene sulfonate and methally sulfonate, formaldehyde, acetone, bisulfate condensate, melamine formaldehyde condensate, and mixtures thereof;
    a suspending agent and friction reducer;
    a mixture of foaming and foam stabilizing surfactants; and a gas.

2. The foamed spacer fluid of claim 1 wherein the dispersing agent is present in the foamed spacer fluid in an amount in the range of from about 3.5% to about 6% by weight of the water therein.

3. The foamed spacer fluid of claim 1 wherein the suspending agent and friction reducer is selected from the group consisting of sepiolite, whelan gum, xanthan gum, hydroxyethyl cellulose, bentonite, attapulgite, and mixtures thereof.

4. The foamed spacer fluid of claim 1 wherein the suspending agent and friction reducer is xanthan gum.

TABLE III

Foamed Spacer Fluid Rheologies At 80° F., 130° F. and 180° F.

| | 10 lb/gal Foamed Spacer | | | 12 lb/gal Foamed Spacer | | | 14 lb/gal Foamed Spacer | | |
|---|---|---|---|---|---|---|---|---|---|
| RPM | 80° F. | 130° F. | 180° F. | 80° F. | 130° F. | 180° F. | 80° F. | 130° F. | 180° F. |
| 600 | 174 | 90 | 57 | 150 | 88 | 50 | 127 | 88 | 69 |
| 300 | 117 | 59 | 38 | 100 | 57 | 35 | 85 | 59 | 46 |
| 200 | 92 | 46 | 30 | 79 | 45 | 29 | 67 | 46 | 37 |
| 100 | 63 | 31 | 22 | 55 | 31 | 21 | 47 | 32 | 25 |
| 6 | 19 | 8 | 6 | 16 | 9 | 6.5 | 15 | 10 | 7 |
| 3 | 15 | 6.5 | 4 | 13 | 6.5 | 5 | 12 | 7.5 | 5 |

TABLE IV

Non-Foamed Spacer Fluid Rheologies At 80° F., 130° F. and 180° F.

| | 10 lb/gal Non-Foamed Spacer | | | 12 lb/gal Non-Foamed Spacer | | | 14 lb/gal Non-Foamed Spacer | | |
|---|---|---|---|---|---|---|---|---|---|
| RPM | 80° F. | 130° F. | 180° F. | 80° F. | 130° F. | 180° F. | 80° F. | 130° F. | 180° F. |
| 600 | 49 | 37 | 32 | 82 | 60 | 51 | 97 | 72 | 61 |
| 300 | 36 | 28 | 25 | 60 | 47 | 39 | 68 | 51 | 44 |
| 200 | 31 | 25 | 22 | 47 | 42 | 34 | 55 | 42 | 36 |
| 100 | 24 | 20 | 17.5 | 36 | 31 | 26 | 41 | 31 | 27 |
| 6 | 9 | 8 | 7.5 | 14 | 12 | 10 | 17 | 12.5 | 10 |
| 3 | 7.5 | 6.5 | 6 | 11 | 10 | 8 | 14 | 10.5 | 8 |

From Tables III and IV above, it can been seen that the foamed spacer fluids of this invention have higher rheologies than the non-foamed spacer fluids. The higher rheologies of the foamed spacer fluids allow them to be pumped in laminar flow at reasonable displacement rates. These properties improve drilling fluid and filter cake removal from the 5. The foamed spacer fluid of claim 1 wherein the suspending agent and friction reducer is present in the foamed spacer fluid in an amount in the range of from about 0.5% to about 2% by weight of the water therein.

6. The foamed spacer fluid of claim 1 wherein the mixture of foaming and foam stabilizing surfactants is selected from the group consisting of a mixture of an ethoxylated alcohol ether sulfate surfactant, an alkyl or alkene amidopropyl betaine surfactant and an alkyl or alkene amidopropyl dimethyl amine oxide surfactant and a mixture of an alpha-olefinic sulfonate surfactant and an alkyl or alkene amidopropyl betaine surfactant.

7. The foamed spacer fluid of claim 1 wherein the mixture of foaming and foam stabilizing surfactants is a mixture of an ethoxylated alcohol ether sulfate surfactant, an alkyl or alkene amidopropyl betaine surfactant and an alkyl or alkene amidopropyl dimethyl amine oxide surfactant.

8. The foamed spacer fluid of claim 1 wherein the mixture of foaming and foam stabilizing surfactants is present in the foamed spacer fluid in an amount in the range of from about 0.5% to about 5% by weight of the water therein.

9. The foamed spacer fluid of claim 1 wherein the gas is nitrogen.

10. The foamed spacer fluid of claim 1 wherein the gas is present in the foamed spacer fluid in an amount in the range of from about 15% to about 70% by volume of the water.

11. The foamed spacer fluid of claim 1 which further comprises a well bore wall scouring material selected from the group consisting of diatomaceous earth, crystalline silica, amorphous silica, and mixtures thereof.

12. The foamed spacer fluid of claim 11 wherein the scouring material is crystalline silica.

13. The foamed spacer fluid of claim 11 wherein the scouring material is present in the foamed spacer fluid in an amount in the range of from about 15% to about 30% by weight of the water therein.

14. A foamed spacer fluid comprising:
water;
a weighting material selected from the group consisting of barium sulfate, hematite, manganese tetraoxide and calcium carbonate;
a dispersing agent selected from the group consisting of naphthalene sulfonate condensed with formaldehyde, sodium polyacrylate, a terpolymer of acrylic acid, alkyloxybenzene sulfonate and methally sulfonate, formaldehyde, acetone, bisulfate condensate, melamine formaldehyde condensate, and mixtures thereof;
a suspending agent and friction reducer selected from the group consisting of sepiolite, whelan gum, xanthan gum, hydroxyethyl cellulose, bentonite, attapulgite, and mixtures thereof;
a mixture of foaming and foam stabilizing surfactants selected from the group consisting of a mixture of an ethoxylated alcohol ether sulfate surfactant, an alkyl or alkene amidopropyl betaine surfactant and an alkyl or alkene amidopropyl dimethyl amine oxide surfactant and a mixture of an alpha-olefinic sulfonate surfactant and an alkyl or alkene amidopropyl betaine surfactant; and
a gas.

15. The foamed spacer fluid of claim 14 wherein the water is selected from the group consisting of fresh water and salt water.

16. The foamed spacer fluid of claim 14 wherein the weighting material is barium sulfate.

17. The foamed spacer fluid of claim 14 wherein the weighting material is present in an amount in the range of from about 49 to about 576 pounds per barrel of water in the spacer fluid.

18. The foamed spacer fluid of claim 14 wherein the dispersing agent is present in the foamed spacer fluid in an amount in the range of from about 3.5% to about 6% by weight of the water therein.

19. The foamed spacer fluid of claim 14 wherein the suspending agent and friction reducer is xanthan gum.

20. The foamed spacer fluid of claim 14 wherein the suspending agent and friction reducer is present in the foamed spacer fluid in an amount in the range of from about 0.5% to about 2% by weight of the water therein.

21. The foamed spacer fluid of claim 14 wherein the mixture of foaming and foam stabilizing surfactants is a mixture of an ethoxylated alcohol ether sulfate surfactant, an alkyl or alkene amidopropyl betaine surfactant and an alkyl or alkene amidopropyl dimethyl amine oxide surfactant.

22. The foamed spacer fluid of claim 14 wherein the mixture of foaming and foam stabilizing surfactants is present in the foamed spacer fluid in an amount in the range of from about 0.5% to about 5% by weight of the water therein.

23. The foamed spacer fluid of claim 14 wherein the gas is nitrogen.

24. The foamed spacer fluid of claim 14 wherein the gas is present in the foamed spacer fluid in an amount in the range of from about 15% to about 70% by volume of the water.

25. The foamed spacer fluid of claim 14 which further comprises a well bore wall scouring material selected from the group consisting of diatomaceous earth, crystalline silica, amorphous silica, and mixtures thereof.

26. The foamed spacer fluid of claim 25 wherein the scouring material is crystalline silica.

27. The foamed spacer fluid of claim 25 wherein the scouring material is present in the foamed spacer fluid in an amount in the range of from about 15% to about 30% by weight of the water therein.

28. A foamed spacer fluid comprising:
water selected from the group consisting of fresh water and salt water;
a weighting material selected from the group consisting of barium sulfate, hemitate, manganese tetraoxide and calcium carbonate present in an amount in the range of from about 49 to about 576 pounds per barrel of water in the spacer fluid;
a dispersing agent selected from the group consisting of naphthalene sulfonate condensed with formaldehyde, sodium polyacrylate, a terpolymer of acrylic acid, alkyloxybenzene sulfonate and methally sulfonate, formaldehyde, acetone, bisulfate condensate, melamine formaldehyde condensate, and mixtures thereof present in an amount in the range of from about 3.5% to about 6% by weight of water in the spacer fluid;
a suspending agent and friction reducer present in an amount in the range of from about 0.5% to about 5% by weight of water in the spacer fluid;
a mixture of foaming and foam stabilizing surfactants present in an amount in the range of from about 0.5% to about 5% by weight of water in the spacer fluid; and
a gas present in an amount in the range of from about 15% to about 70% by volume of water in the spacer fluid.

29. The foamed spacer fluid of claim 28 wherein the suspending agent and friction reducer is selected from the group consisting of sepiolite, whelan gum, xanthan gum, hydroxyethyl cellulose, bentonite, attapulgite, and mixtures thereof.

30. The foamed spacer fluid of claim 28 wherein the suspending agent and friction reducer is xanthan gum.

31. The foamed spacer fluid of claim 28 wherein the mixture of foaming and foam stabilizing surfactants is selected from the group consisting of a mixture of an ethoxylated alcohol ether sulfate surfactant, an alkyl or alkene amidopropyl betaine surfactant and an alkyl or alkene amidopropyl dimethyl amine oxide surfactant and a mixture of an alpha-olefinic sulfonate surfactant and an alkyl or alkene amidopropyl betaine surfactant.

32. The foamed spacer fluid of claim 28 wherein the mixture of foaming and foam stabilizing surfactants is a mixture of an ethoxylated alcohol ether sulfate surfactant, an alkyl or alkene amidopropyl betaine surfactant and an alkyl or alkene amidopropyl dimethyl amine oxide surfactant.

33. The foamed spacer fluid of claim 28 wherein the gas is nitrogen.

34. The foamed spacer fluid of claim 28 which further comprises a well bore wall scouring material selected from the group consisting of diatomaceous earth, crystalline silica, amorphous silica, and mixtures thereof.

35. The foamed spacer fluid of claim 34 wherein the scouring material is crystalline silica.

36. The foamed spacer fluid of claim 34 wherein the scouring material is present in the foamed spacer fluid in an amount in the range of from about 15% to about 30% by weight of the water therein.

* * * * *